United States Patent Office 2,710,301
Patented June 7, 1955

2,710,301

PHOSPHORUS ESTERS AND A PROCESS FOR THE PREPARATION OF THE SAME

Rupert C. Morris, Berkeley, and John L. Van Winkle, San Lorenzo, Calif., assignors to Shell Development Company, Emeryville, Calif., a corporation of Delaware No Drawing. Application September 30, 1952, Serial No. 312,394

17 Claims. (Cl. 260—461)

This invention pertains to certain novel phosphorus esters and to a process for the preparation of the same. More particularly, the present invention pertains to certain novel esters of phosphonic acids, which esters contain in their structure both the esterified phosphono group and a plurality of carboxyl groups combined in ester linkage. The invention further pertains to a method for the preparation of the novel esters comprising an apparently new reaction effected between (a) certain neutral polyesters of polycarboxylic acids with halogeno-substituted alcohols and (b) neutral, or full, esters of polybasic oxy-acids of trivalent phosphorus.

The new esters to which the invention pertains have the structure which is represented by the structural formula $$R^3{}_y(RO)_xP(O)—R^1—OOC—R^2[—COO—R^1—P(O)(OR)_xR^3{}_y]_z$$

in which the residue —OOC—R²[—COO—]z represents the residue —OOC—R²[—COO—]z of a di- or tri-carboxylic acid HOOC—R²[—COOH]z, each R¹ represents an alkylene group, each RO— represents the residue RO— and an alcohol ROH, each R³ represents a hydrocarbon group, $x=1$ or $2$, or $y=2-x$ and $z=1$ or $2$. The invention thus provides the esters represented by the foregoing structural formula wherein the group

is the residue of an aliphatic dicarboxylic acid, such as succinic acid, glutaric acid, adipic acid, sebacic acid, or other acid wherein R² may be a straight-chain or branched-chain alkylene group, as well as corresponding derivatives of cyclic acids, such as of terephthalic acid, o-phthalic acid, naphthalene-1,5-dicarboxylic acid, dibenzyl-4,4-dicarboxylic acid, and cyclohexane-1,4-dicarboxylic acid. Suitable tricarboxylic acids are 1,2,4-butane tricarboxylic acid, tricarballylic acid, and trimellitic acid. The alkylene groups represented by R¹ contain from two to twelve carbon atoms and may be either straight-chain alkylene groups or branched-chain alkylene groups, and the two alkylene groups represented by R¹ may be the same or different. The groups represented by RO—, which may be the same or different, preferably are residues of aliphatic alcohols each containing from one to twelve carbon atoms, preferably from one to eight carbon atoms. R³ is a hydrocarbon group, such as an alkyl or aryl group, containing from one to twelve carbon atoms.

It is known that alkalinous metal salts of dialkyl phosphites when heated with esters of carboxylic acids react therewith to form a phosphonic ester wherein the radical that is bonded to the phosphorus atom by a carbon-to-phosphorus bond corresponds to the alcohol radical of the carboxylic acid ester. When the alcohol radical is one which has a halogen substituent thereon reaction may also occur leading to replacment of the halogeno substituent by the dialkylphosphono group corresponding to the phosphorus reactant.

The method of the present invention is based in part upon the discovery that, unlike the alkalinous metal salts of dialkyl phosphites, the neutral esters, i. e., triesters, of phosphorous acid, when heated with carboxylic acid esters of halogeno-substituted alcohols react selectively with or at the halogeno substituent, whereby the carboxylic ester linkage remains intact and there is produced a corresponding ester of a dialkyl phosphono-substituted alcohol with the carboxylic acid. Neutral esters, i. e., diesters, of phosphonous acids can be employed equivalently to produce the novel esters represented by the generic formula when y equals unity. The reaction may be illustrated by the following equation which describes the reaction of triethyl phosphite with bis(2-bromoethyl) adipate to produce bis[2-(diethyl phosphono)-ethyl] adipate:

$$2(C_2H_5O)_3P + BrCH_2CH_2—OOC—(CH_2)_4—$$
$$COO—CH_2CH_2—Br \rightarrow (C_2H_5O)_2P(O)—$$
$$CH_2CH_2—OOC—(CH_2)_4—COO—CH_2CH_2—$$
$$P(O)(OC_2H_5)_2 + 2C_2H_5Br$$

The reaction is further illustrated by the following equation for the reaction between tributyl phosphite and bis(3-chloropropyl) terephthalate to produce bis[3-(dibutyl phosphono)propyl] terephthalate:

$$2(C_4H_9O)_3P + Cl—CH_2CH_2CH_2—OOC—C_6H_4—$$
$$COO—CH_2CH_2CH_2—Cl \rightarrow (C_4H_9)_2P(O)—$$
$$CH_2CH_2CH_2—OOC—C_6H_4—COO—$$
$$CH_2CH_2CH_2—P(O)(OC_4H_9)_2 + 2C_4H_9Br$$

In the more general case, the reaction between the triester of phosphorous acid or the phosphonous acid diester and the ester of the polycarboxylic acid with the halogen-substituted alcohol to produce the novel products of the invention can be represented by the equation:

$$zRO—P(OR)_xR^3{}_y + X—R^1—OOC—R^2$$
$$[—COO—R^1—X]_z \rightarrow R^3{}_y(RO)_xP(O)—R^1—OOC—$$
$$R^2[—COO—R^1—P(O)(OR)_xR^3{}_y]_z + 2RX$$

in which R, R¹, R², R³ and $x$, $y$ and $z$ are defined as above and each X represents an atom of halogen, preferably bromine or chlorine.

The novel compounds of the present invention thus may be prepared conveniently in accordance with the invention by reacting together a neutral, or full, ester of a polybasic oxy-acid of trivalent phosphorus and a di- or tri-ester of a di- or tri-carboxylic acid, respectively, and a halogen-substituted alcohol. As the phosphorus ester there may be employed a trialkyl phosphite, wherein the alkyl groups may be the same or dissimilar, or other triester of phosphorous acid with the same or with dissimilar aliphatic alcohols, the ester containing preferably from one to twelve carbon atoms in each of the alcohol radicals. Suitable trialkyl phosphites which may be employed include, among others, trimethyl phosphite, triethyl phosphite, tri-isopropyl phosphite, tributyl phosphite, di-n-propyl ethyl phosphite, tri-2-ethylhexyl phosphite, trinonyl phosphite, and tridodecyl phosphite. Instead of a trialkyl phosphite there may be employed an unsaturated aliphatic triester of phosphorus acid, such as triallyl phosphite, trimethallyl phosphite, or allyl diethyl phosphite, or an ester of phosphorus acid with an aliphatic alcohol, which alcohol contains more than the one oxy oxygen atom, such as 2-methoxyethyl diethyl phosphite, tris-2-ethoxyethyl phosphite, or diethyl 2-(2-ethoxyethyl) ethyl phosphite. Diesters of phosphonous acids which can be employed include, among others, dialkyl benzene phosphonites, such as dibutyl benzene phosphonite and dipropyl benzene phosphonite, and dialkyl alkane phosphonites, such as dibutyl butane phosphonite.

As the diester of a dicarboxylic acid and a halogen-substituted alcohol there are employed in accordance with the invention the diesters represented by the formula:

$$X—R^1—OOC—R^2[—COO—R^1—X]_z$$

in which $z$ is 1 or 2, each X represents an atom of halogen, preferably bromine or chlorine, each $R^1$ represents an alkylene group, $R^2$ represents an essentially hydrocarbon radical of valency $z+1$, which radical may be open-chain or which may contain, or be composed of, or consist essentially of, a carbocyclic structure, such as an aryl group or a cycloalkyl group. By the expression "essentially hydrocarbon" it is meant that the radical represented by $R^2$ is an unsubstituted hydrocarbon radical or, if a substituted hydrocarbon radical, it is one which is substituted only to a minor extent by inert substituents which do not alter the essentially hydrocarbon character of the radical. In the preferred esters the group $R^2$ is an unsubstituted divalent hydrocarbon radical. Esters of polycarboxylic acids corresponding to the immediately foregoing structural formula which may be employed in accordance with the invention include esters of such non-geminate halogen-substituted aliphatic alcohols as 2-bromoethanol, 2-chloroethanol, 2-bromopropanol, 3-chloropropanol, 2-methyl-3-chloropropanol, 5-chloropentanol, 3-chloromethyloctanol, and their homologs and analogs. The following are illustrative of the diesters of dicarboxylic acids with halogen-substituted alcohols which can be used in the process of the invention: bis(2-bromoethyl) adipate, bis (2-bromoethyl) sebacate, bis(3-bromopropyl) malonate, 3-chloropropyl-2-chloroethyl succinate, bis(2-bromoethyl) methylsuccinate, bis(2-bromoethyl) octylsuccinate, bis(2-bromoethyl) octenylsuccinate, bis(3-bromopropyl) glutarate, bis(2-chloroethyl) s-diphenylsuccinate, bis(2-bromopropyl) suberate, bis(4-bromobutyl) pimelate, bis(2-chloroethyl) azeleate, bis(2-bromoethyl) terephthalate, bis(2-bromoethyl) biphenyl-1,4'-dicarboxylate, bis(2-chloroethyl) cyclohexane-1,4-dicarboxylate, bis(2-chloromethylbutyl) benzene-1,4-diacetate, tris-2-chloroethyl tricarballylate and tris-2-bromoethyl mellitate.

The reaction between the ester of the phosphorus acid and the polyester of the polycarboxylic acid with a halogen-substituted alcohol can be effected in accordance with the invention by heating the mixed reactants together at elevated temperature. The relative amounts of the two reactants, while not highly critical, preferably should be in about stoichiometric proportions, e. g., about 2 moles of the phosphorus ester per mole of the dicarboxylic acid diesters, while a small excess of the phosphorus ester, up to an amount about double the amount stoichiometrically required, is advantageous for favoring more complete consumption of the carboxylic ester reactant. Either lesser or greater amounts of the phosphorus reactant can be employed if desired although undue excesses of either reactant should be avoided for most efficient operation. A practical broader range of proportions includes from about 0.5 to about 6 moles of the phosphorus reactant per mole of the carboxylic ester reactant.

The reaction temperature ordinarily lies within the range of from about 100° C. to about 250° C., the optimum temperature depending largely upon the particular reactants which are involved. Upon commencement of the reaction and while the reaction progresses, organic halide, formed by union of an alcohol radical of the phosphorus reactant with halogen of the carboxylic ester reactant, is evolved. Such organic halide advantageously is continuously volatilized from the reaction mixture and withdrawn from the system as formed, as by conducting the reaction at boiling in a vessel equipped with a fractionating column and continuously fractionating the evolved organic halide from the vapors. The extent of reaction may be followed by collecting and measuring the amount of the evolved organic halide. Ordinarily the heating will be continued until reaction stops as judged by the evolution of the organic halide although, of course, the reaction may be interrupted at an earlier time if desired.

The reaction may be carried out if desired in the presence of an inert organic solvent, such as a hydrocarbon solvent, although the use of a solvent is not essential. For example, removal of the evolved organic halide may be facilitated by azeotropic distillation with an added volatile organic solvent. The reaction can also be effected by heating the selected reactants together in a sealed vessel, although less advantageously than when continuously withdrawing the evolved organic halide from the reaction system. The total amount of each reactant may be charged to the reaction vessel initially, or one of the reactants may be added progressively to the other during the course of the reaction. The desired product may be recovered from the mixture by any suitable method, such as by distillation in vacuo, by treatment with selective solvents, or by equivalent procedures.

The following examples are presented for the purpose of illustrating the invention, it being understood that the invention is not intended to be restricted to the specific illustrative examples and that other specific modifications are included by the invention. In the examples the parts are by weight unless otherwise specified.

*Example I*

To a reaction vessel equipped with an electric heater, mechanical stirrer, and a frationating column arranged for reflux of condensate, there are charged 397 parts of bis(2-bromoethyl) adipate and 625 parts of tributyl phosphite. After the initial vigorous exothermic reaction subsides, the mixture is heated for 6 hours at temperatures increasing from about 150° C. to about 220° C. as the reaction progresses. Throughout the reaction time the evolved vapors are fractionated, butyl bromide being withdrawn overhead from the top of the column while higher-boiling materials are condensed and run back into the reaction vessel. The reaction mixture then is fractionally distilled to recover in good yield the bis[2-(dibutyl phosphono)ethyl] adipate formed by the reation. After redistillation the bis[2-(dibutyl phosphono)ethyl] adipate is found to have a boiling point of 170° C. under about 0.04 mm. mercury pressure. Refractive index ($n20/D$) 1.4545. Density (20/4) 1.0761.

*Example II*

There are mixed in the vessel used in the preceding example 380 parts of bis(2-bromoethyl) terephthalate and 365 parts of triethyl phosphite. After the initial vigorous exothermic reaction has subsided the mixture is heated at temperature up to about 190° C. until evolution of ethyl bromide ceases, and then is fractionally distilled to recover the bis[2-(diethyl phosphono)ethyl]terephthalate which is produced. The structural formula for the bis[2-(diethyl phosphono)ethyl] terephthalate is as follows:

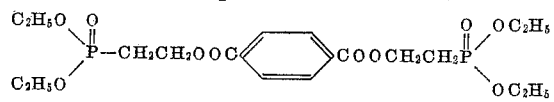

*Example III*

There are mixed in the vessel used in the preceding examples 325 parts of bis(3-chloropropyl) cyclohexane-1,4-dicarboxylate and 300 parts of tri-n-propyl phosphite. The mixture is heated at temperatures up to about 200° C. until evolution of propyl chloride ceases and then is fractionally distilled to recover the bis[3-(dipropyl phosphono)propyl] cyclohexane-1,4-dicarboxylate which is produced. The structural formula for the bis[3-dipropyl phosphono)propyl] cyclohexane-1,4-dicarboxylate is as follows:

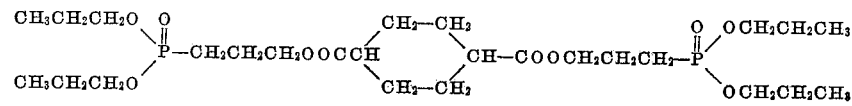

Other esters which are provided by the invention and which can be prepared by the method illustrated in the foregoing examples are as follows:

Bis[4-(dioctyl phosphono)butyl] succinate, having the structural formula $$\begin{array}{c}C_8H_{17}O\\C_8H_{17}O\end{array}\!\!>\!\!\overset{O}{\underset{\|}{P}}\!-\!CH_2CH_2CH_2CH_2\!-\!OOC\!-\!CH_2CH_2\!-\!COO\!-\!CH_2CH_2CH_2CH_2\!-\!\overset{O}{\underset{\|}{P}}\!\!<\!\!\begin{array}{c}OC_8H_{17}\\OC_8H_{17}\end{array}$$

and prepared from trioctyl phosphite and bis(4-bromobutyl) succinate;

Bis[3-(diallyl phosphono)propyl]glutarate, having the structural formula $$\begin{array}{c}CH_2\!=\!CH\!-\!CH_2O\\CH_2\!=\!CH\!-\!CH_2O\end{array}\!\!>\!\!\overset{O}{\underset{\|}{P}}\!-\!CH_2CH_2CH_2\!-\!OOC\!-\!CH_2CH_2CH_2\!-\!COO\!-\!CH_2CH_2CH_2\!-\!\overset{O}{\underset{\|}{P}}\!\!<\!\!\begin{array}{c}OCH_2\!-\!CH\!=\!CH_2\\OCH_2\!-\!CH\!=\!CH_2\end{array}$$

and prepared from triallyl phosphite and bis(3-chloropropyl) glutarate;

Bis[2-(dibutyl phosphono)butyl] subarate, having the structural formula $$\begin{array}{c}C_4H_9O\\C_4H_9O\end{array}\!\!>\!\!\overset{O}{\underset{\|}{P}}\!-\!\underset{C_2H_5}{\underset{|}{CH}}\!-\!CH_2\!-\!OOC\!-\!(CH_2)_6\!-\!COO\!-\!CH_2\!-\!\underset{C_2H_5}{\underset{|}{CH}}\!-\!\overset{O}{\underset{\|}{P}}\!\!<\!\!\begin{array}{c}OC_4H_9\\OC_4H_9\end{array}$$

and prepared from tributyl phosphite and bis(2-bromobutyl) subarate;

Bis[2-(dihexyl phosphono)ethyl] benzene-1,4-diacetate, having the structural formula $$\begin{array}{c}C_6H_{13}O\\C_6H_{13}O\end{array}\!\!>\!\!\overset{O}{\underset{\|}{P}}\!-\!CH_2CH_2\!-\!OOC\!-\!CH_2\!-\!\!\!\bigcirc\!\!\!-\!CH_2\!-\!COO\!-\!CH_2CH_2\!-\!\overset{O}{\underset{\|}{P}}\!\!<\!\!\begin{array}{c}OC_6H_{13}\\OC_6H_{13}\end{array}$$

and prepared from trihexyl phosphite and bis(2-bromoethyl) benzene-1,4-diacetate;

Bis[4-dibutyl phosphono)butyl] fumarate, having the structural formula $$\begin{array}{c}C_4H_9O\\C_4H_9O\end{array}\!\!>\!\!\overset{O}{\underset{\|}{P}}\!-\!CH_2CH_2CH_2CH_2\!-\!OOC\!-\!CH\!=\!CH\!-\!COO\!-\!CH_2CH_2CH_2CH_2\!-\!\overset{O}{\underset{\|}{P}}\!\!<\!\!\begin{array}{c}OC_4H_9\\OC_4H_9\end{array}$$

and prepared from tributyl phosphite and bis(4-bromobutyl) fumarate;

Bis[2-(beta-methoxyethyl phosphono)ethyl] adipate, having the structural formula $$\begin{array}{c}CH_3OCH_2CH_2O\\CH_3OCH_2CH_2O\end{array}\!\!>\!\!\overset{O}{\underset{\|}{P}}\!-\!CH_2CH_2\!-\!OOC\!-\!(CH_2)_4\!-\!COO\!-\!CH_2CH_2\!-\!\overset{O}{\underset{\|}{P}}\!\!<\!\!\begin{array}{c}O\!-\!CH_2CH_2OCH_3\\O\!-\!CH_2CH_2OCH_3\end{array}$$

and prepared from tris(beta-methoxyethyl) phosphite and bis(betabromoethyl) adipate;

2-(diethyl phosphono)ethyl 3-(diethylphosphonopropyl) butylsuccinate having the structural formula $$\begin{array}{c}C_2H_5O\\C_2H_5O\end{array}\!\!>\!\!\overset{O}{\underset{\|}{P}}\!-\!CH_2CH_2\!-\!OOC\!-\!\underset{C_4H_9}{\underset{|}{CH}}\!-\!CH_2\!-\!COO\!-\!CH_2CH_2CH_2\!-\!\overset{O}{\underset{\|}{P}}\!\!<\!\!\begin{array}{c}OC_2H_5\\OC_2H_5\end{array}$$

and prepared from triethyl phosphite and 2-bromoethyl 3-bromopropyl butylsuccinate;

Tris[2-(dibutyl phosphono)ethyl] 1,2,4-butanetricarboxylate, having the structural formula $$\begin{array}{c}C_4H_9O\\C_4H_9O\end{array}\!\!>\!\!\overset{O}{\underset{\|}{P}}\!-\!CH_2CH_2\!-\!OOC\!-\!CH_2\!-\!\underset{\underset{\underset{OC_4H_9}{\overset{|}{OC_4H_9}}}{\overset{|}{\underset{\|}{P}}}}{\underset{|}{CH}}\!-\!CH_2\!-\!CH_2\!-\!COO\!-\!CH_2CH_2\!-\!\overset{O}{\underset{\|}{P}}\!\!<\!\!\begin{array}{c}OC_4H_9\\OC_4H_9\end{array}$$

and prepared from tributyl phosphite and tris[2-bromoethyl] 1,2,4-butanetricarboxylate;

Bis[2-(butyl benzene phosphinico)ethyl] adipate, having the structural formula $$\begin{array}{c}C_4H_9O\\C_6H_5\end{array}\!\!>\!\!\overset{O}{\underset{\|}{P}}\!-\!CH_2CH_2\!-\!OOC\!-\!(CH_2)_4\!-\!COO\!-\!CH_2CH_2\!-\!\overset{O}{\underset{\|}{P}}\!\!<\!\!\begin{array}{c}OC_4H_9\\C_6H_5\end{array}$$

and prepared from dibutyl benzene phosphonite and bis(2-chloroethyl) adipate; and Tris[2-(dibutyl phosphono)ethyl] trimellitate, having the structural formula $$\begin{array}{c}C_4H_9O\\C_4H_9O\end{array}\!\!>\!\!\overset{O}{\underset{\|}{P}}\!-\!CH_2CH_2\!-\!OOC\!\!\!\bigcirc\!\!\!\begin{array}{c}COO\!-\!CH_2CH_2\!-\!\overset{O}{\underset{\|}{P}}\!\!<\!\!\begin{array}{c}OC_4H_9\\OC_4H_9\end{array}\\COO\!-\!CH_2CH_2\!-\!\overset{O}{\underset{\|}{P}}\!\!<\!\!\begin{array}{c}OC_4H_9\\OC_4H_9\end{array}\end{array}$$

and prepared from tributyl phosphite and tris(2-bromoethyl)trimellitate.

The novel compounds of the invention, which range from viscous liquids to soft solids, are of particular interest by reason of their stability and rheological properties for use as hydraulic fluids or as components of hydraulic fluids. They also may be used as plasticizers for synthetic as well as for naturally occurring resins. The new esters of the invention may be used as lubricants, alone or compounded in admixture with known synthetic and naturally occurring lubricants, such as mineral oils, polyesters of polycarboxylic acids, alkylene oxide polymers, and the like.

We claim as our invention:

1. A phosphorus ester having the structure represented by the formula $$R_{y^3}(RO)_xP(O)\text{---}R^1\text{---}OOC\text{---}R^2[\text{---}COO\text{---}R^1\text{---}P(O)(OR)_xR_{y^3}]_z$$

in which the residue —OOC—R²[—COO—]$_z$ represents the residue —OOC—R²[—COO—]$_z$ of a polycarboxylic acid HOOC—R²[—COOH]$_z$, R² represents a hydrocarbon radical of valence $z+1$, each $R^1$ represents an alkylene group, each RO— represents the residue RO— of an aliphatic hydrocarbon alcohol ROH, each $R^3$ represents a hydrocarbon group, $x$ is 1 or 2, $y=2-x$, and $z$ is 1 or 2.

2. Bis[(dialkyl phosphono)alkyl]adipate.
3. Bis[(dialkyl phosphono)ethyl]adipate.
4. Bis[dialkyl phosphono)alkyl] alkane-alpha, omega-dicarboxylate.
5. Bis[(dialkyl phosphono)alkyl] terephthalate.
6. Bis[dialkyl phosphono)alkyl] cyclohexanedicarboxylate.
7. Bis[2-dibutyl phosphono)ethyl] adipate.
8. Bis[2-(diethyl phosphono)ethyl] terephthalate.
9. Bis[3-dipropyl phosphono)propyl] cyclohexane-1,4-dicarboxylate.
10. A process which comprises heating together (a) a neutral ester of a polycarboxylic acid, $$HOOC-R^2[-COOH]_z$$

with a halogeno-substituted aliphatic alcohol and (b) a neutral ester of a polybasic oxy-acid of phosphorus, $ROP(OR)_xR_y^3$, at a temperature of from about 100° C. to about 250° C. until there is produced a phosphorus ester having the structure represented by the formula $$R_y^3(RO)_xP(O)-R^1-OOC-R^2[-COO-R^1-P(O)(OR)_xR_y]_z$$

in which —OOC—$R^2$[—COO—]$z$ represents the residue —OOC—$R^2$[—COO—]$_z$ of the polycarboxylic acid, $R^2$ represents a hydrocarbon radical of valence $z+1$, and the RO groups correspond to the RO— groups of the phosphorus ester, R represents an aliphatic hydrocarbon group, $R^3$ represents a hydrocarbon group $x$ is 1 or 2, $y=2-x$, and $z$ is 1 or 2, and $R^1$ represents an alkylene group.

11. The process which comprises heating together a trialkyl phosphite and a diester of a dicarboxylic acid with a halogeno-substituted alcohol at a temperature of from about 100° C. to about 250° C. while withdrawing evolved alkyl halide and continuing such heating until there is produced a diester of the dicarboxylic acid and a dialkyl phosphono-substituted alcohol.

12. The process according to claim 11 in which the dicarboxylic acid is an aromatic dicarboxylic acid.

13. The process according to claim 11 in which the dicarboxylic acid is an aliphatic dicarboxylic acid.

14. The process which comprises heating together a trialkyl phosphite and a bis(haloalkyl) alkanedicarboxylate at reaction temperature between about 100° C. and about 250° C. while withdrawing evolved alkyl halide and continuing such heating until there is produced a bis(dialkyl phosphonoalkyl) alkanedioate.

15. A process which comprises heating together a trialkyl phosphite and a bis(haloalkyl) adipate at a temperature of from about 100° C. to about 250° C. and continuing such heating until there is produced a bis[(dialkyl phosphono)alkyl] adipate.

16. A process which comprises heating together a trialkyl phosphite and a bis(haloalkyl) terephthalate at a temperature of from about 100° C. to about 250° C. and continuing such heating until there is produced a bis[(dialkyl phosphono)alkyl] terephthalate.

17. A process which comprises heating together a trialkyl phosphite and a bis(haloalkyl) cyclohexanedicarboxylate at a temperature of from about 100° C. to about 250° C. and continuing such heating until there is produced a bis[(dialkyl phosphono)alkyl] cyclohexanedicarboxylate.

References Cited in the file of this patent

UNITED STATES PATENTS

| | | |
|---|---|---|
| 2,478,441 | Wiley | Aug. 9, 1949 |
| 2,632,756 | Harman et al. | Mar. 24, 1953 |
| 2,634,288 | Boyer et al. | Apr. 7, 1953 |